United States Patent [19]

Van Hout

[11] Patent Number: 4,748,385
[45] Date of Patent: May 31, 1988

[54] BRUSHLESS D.C. MOTOR AND SWITCHING DEVICE FOR USE IN SUCH A D.C. MOTOR

[75] Inventor: Henricus M. Van Hout, Eindhoven, Netherlands

[73] Assignee: U.S. Philips Corporation, New York, N.Y.

[21] Appl. No.: 33,713

[22] Filed: Apr. 3, 1987

[30] Foreign Application Priority Data

Nov. 12, 1986 [NL] Netherlands ............ 8602862

[51] Int. Cl.[4] ............................................ H02K 29/08
[52] U.S. Cl. .................................... 318/254; 318/138; 318/439
[58] Field of Search .................... 318/138, 254, 439

[56] References Cited

U.S. PATENT DOCUMENTS

| 4,435,673 | 3/1984 | Hagino et al. | 318/138 X |
| 4,442,386 | 4/1984 | Uchida et al. | 318/254 |
| 4,447,771 | 5/1984 | Whited | 318/254 X |
| 4,626,752 | 12/1986 | Fujisaki et al. | 318/254 |
| 4,628,231 | 12/1986 | Radziwill et al. | 318/138 |
| 4,644,234 | 2/1987 | Nola | 318/254 |

Primary Examiner—Bentsu Ro
Attorney, Agent, or Firm—David R. Treacy; Bernard Franzblau

[57] ABSTRACT

A multi-phase brushless d.c. motor comprises a permanent-magnet rotor (1) and a stator (2) with stator coils (16, ..., 21) arranged between three power lines (A, B, C). For the purpose of commutation the motor is provided with switching devices (22A, 22B, 22C) for the cyclic disconnection and connection of the power-supply lines (A, B, C) of the motor to a d.c. power source (25). Each switching device (22) comprises a section (42) which is controlled by the rotor-magnet field for deriving the disconnection instants and a section (43) for deriving the connection instants from a voltage change which is produced on the power-supply line connected to the switching device as a result of another power-supply line being disconnected.

8 Claims, 3 Drawing Sheets

BRUSHLESS D.C. MOTOR AND SWITCHING DEVICE FOR USE IN SUCH A D.C. MOTOR

BACKGROUND OF THE INVENTION

This invention relates to a brushless d.c. motor comprising a permanent-magnetic rotor, a stator provided with stator coils which are arranged between power supply lines, and a commutation circuit for the cyclic connection and disconnection of the power supply lines to/from a d.c. power source by means of switching devices which are controlled by the rotor magnet field. Each switching device comprises a series arrangement of a first electronic switch and a second electronic switch, which series arrangement is connectable between the positive terminal and the negative terminal of the d.c. power source. The apparatus includes a magneto-sensitive element for detecting the rotor magnet field and a control circuit for opening the first and second switches depending on the magnetic field detected by the magneto-sensitive element. Each of the power supply lines is connected to one of the junction points between the first and second switches.

Such a d.c. motor and switching device are known from U.S. Pat. No. 4,628,231.

In the known d.c. motor the opening and closing instants of the switches are derived separately for each switching device from the strength of the rotor magnet field, so that the switches of each switching device are controlled fully independently of the other switching devices. In the known motor the switching devices therefore require a minimal number of terminals, which is attractive in view of cost reduction if each switching device is wholly incorporated in an integrated circuit. However, a drawback of the known motor is that as a result of the independent control of the switches, the opening instants and the closing instants of the switches in different switching devices are not exactly contiguous. This leads to a substantial fluctuation in motor current consumption and hence to substantial fluctuations in the motor torque, which is proportional to the motor current.

SUMMARY OF THE INVENTION

It is an object of the invention to provide a brushless d.c. motor of the type defined in the opening paragraph having a uniform torque and in which each switching device has a minimal number of terminals.

According to the invention this object is achieved in that the control circuit of each switching device comprises closing means for closing the first switch or the second switch in response to a voltage change at the junction point between the first switch and the second switch, which voltage change is caused by respectively a first or a second switch of another switching device being opened.

The invention is based on the recognition of the fact that in a motor in accordance with the invention, the opening instant of an electronic switch can be detected from the behaviour of the voltage on the power-supply line which is disconnected from the direct current source. Immediately connecting the disconnected power-supply line to the direct voltage source in response to the detection of the opening instant, results in a satisfactory contiguity of the closing instant and the opening instant, so that a uniform torque is obtained.

A brushless d.c. motor, in which the control circuit of each switching device comprises second closing means for closing the first switch and the second switch of the control circuit depending on the magnetic field detected by the magneto-sensitive element, is characterized further in that the control circuit of each switching device comprises means for detecting a crossing of a reference level by the rotor magnet field detected by the magneto-sensitive element and for disabling the second closing means for a specific time in response to the crossing detection. This ensures that if, for example as a result of an occasional disturbance, a switch is not closed in response to the voltage change at the junction point, this switch is closed by the second closing means so that the commutation of the motor is sustained.

BRIEF DESCRIPTION OF THE DRAWING

Embodiments of the invention will now be described in more detail, by way of example, with reference to the accompanying drawing in which.

DESCRIPTION OF THE PREFERRED EMBODIMENTS

Figure 1:
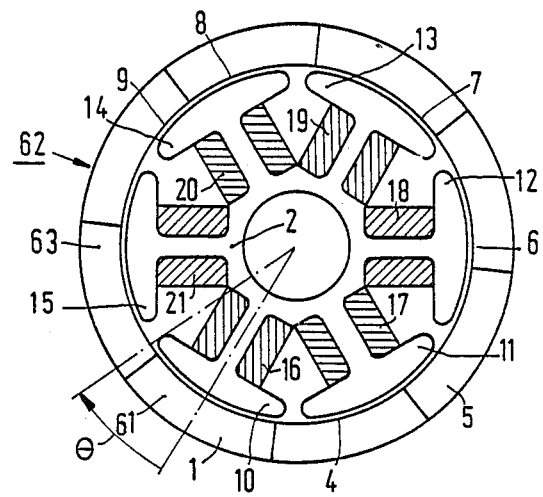
FIG. 1 is a sectional view showing the mechanical construction of a brushless d.c. motor.
Figure 2:
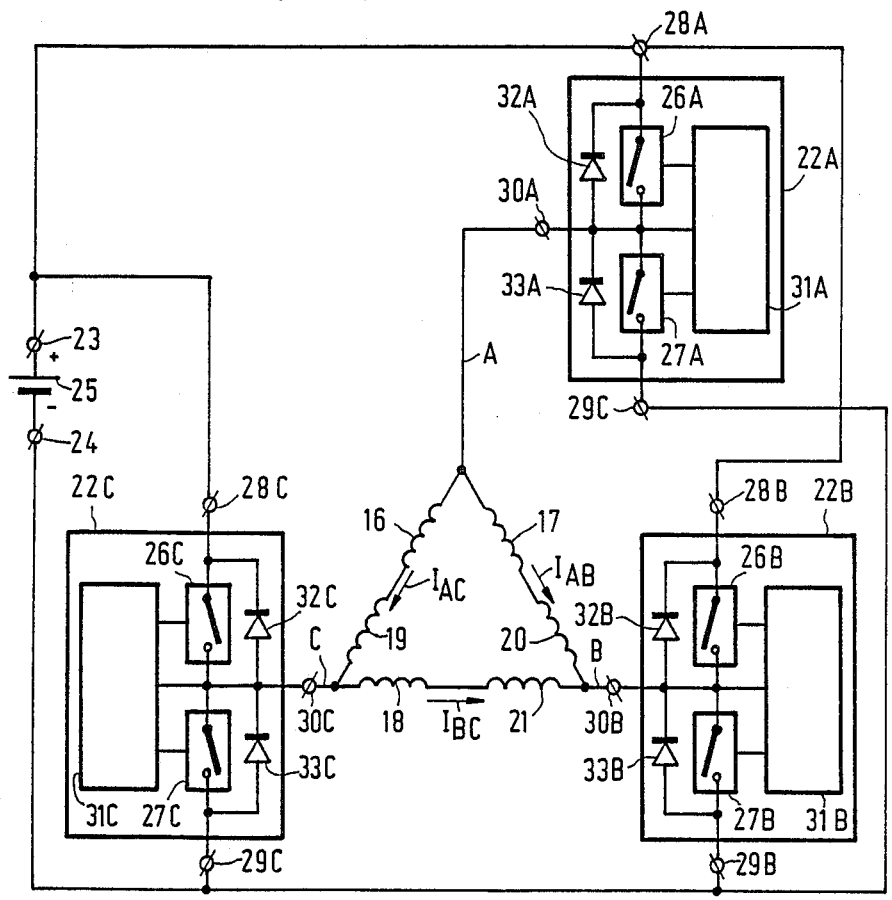
FIG. 2 is the circuit diagram of a motor in accordance with the invention.

FIG. 1 is a sectional view showing a customary mechanical construction for a brushless d.c. motor 62 comprising a cylindrical rotor 1 made of a permanent-magnetic material, which rotor is rotatable around a ferromagnetic stator 2. The angle between the rotor 1 and the stator 2 is designated $\theta$. The stator 2 comprises six stator teeth 10, ..., 15 which are spaced sixty degrees from each other and which have shoe-shaped ends. Four magnetic north poles 5, 7, 9, 61 and four magnetic south poles 4, 6, 8, 63, which are uniformly spaced over the rotor circumference, are situated directly opposite the shoe-shaped ends of the stator teeth 10, ..., 15. The stator teeth 10, ..., 15 constitutes the cores of the respective stator coils 16, ..., 21, which as is shown in FIG. 2 are arranged between three power-supply lines A, B and C. The stator coils 16 and 19 are arranged in series between the power-supply line A and the power-supply line C. The stator coils 17 and 20 are arranged in series between the power-supply line A and the power-supply line B. The stator coils 18 and 21 are arranged in series between the power-supply line B and the power-supply line C. The power supply lines A, B and C are connected to a commutation device comprising three identical switching devices 22A, 22B and 22C. By means of the switching devices 22A, 22B and 22C the power-supply lines A, B and C, respectively can be connected to a positive terminal 23 or a negative terminal 24 of a direct-voltage source 25.

For this purpose each of the switching devices 22 comprises a series arrangement of a first electronic switch 26 (26A, 26B, 26C) and a second electronic switch 27 (27A, 27B, 27C) of a customary type, for example of the transistor type. By means of terminals 28 (28A, 28B, 28C) and terminals 29 (29A, 29B, 29C) the series arrangements are respectively connected to the positive terminal 23 and the negative terminal 24 of the direct-voltage source 25.

The electronic switches 26 and 27 are shunted by freewheel diodes 32 (32A, 32B, 32C) and freewheel diodes 33 (33A, 33B, 33C) respectively. The junction points 30 (30A, 30B, 30C) between the first and second switches are connected to the power-supply lines A, B and C respectively. The electronic switches 26 and 27 are controlled by means of control circuits 31 (31A, 31B, 31C). Each control circuit 31 comprises a first flip-flop 40 (see FIG. 3) and a second flip-flop 41 of a type which in response to a "0"–"1" transition on the set input S adopts the logic "1" state and in response to a "0"–"1" transition on the reset input R assumes the logic "0" state. The output signals $T_p$ and $T_n$ of the flip-flops 40 and 41, respectively, are applied to the electronic switches 26 and 27 as logic control signals. The electronic switches 26 and 27 are constructed in such a way that they are closed in the case of a control signal having the logic "1" state and that they are opened in the case of a logic "0" control signal.

The control circuit 31 comprises a first section 42 for generating reset signals for the flip-flops 40 and 41 depending on the rotor position and a second section 43 for generating set signals for the flip-flops 40 and 41 depending on the voltage variation at the junction point 30. The section 42 together with the other sections of the switching device is secured to the stator 1 at a sufficiently short distance from the rotor to enable the polarity of the passing poles 4, 5, 6, 7, 8, 9, 61 and 63 to be detected. For this purpose the section 42 comprises a magneto-sensitive element 44 in the form of a Hall-sensor, whose outputs are connected to the inverting and non-inverting inputs of a comparator circuit 45. The magneto-sensitive element 44 and the comparator circuit are adapted to one another in such a way that the comparator circuit supplies a logic signal $R_p$ whose logic state depends on the polarity of the magnetic field through the element 44 and is consequently representative of the polarity of the passing rotor pole. The signal $R_p$ is applied to the reset input R of the flip-flop 40. By means of an inverter circuit 46, the signal $R_p$ is inverted. The inverted signal $R_n$ on the output of the inverter circuit 46 is applied to the reset input R of the flip-flop 41.

Figure 4:
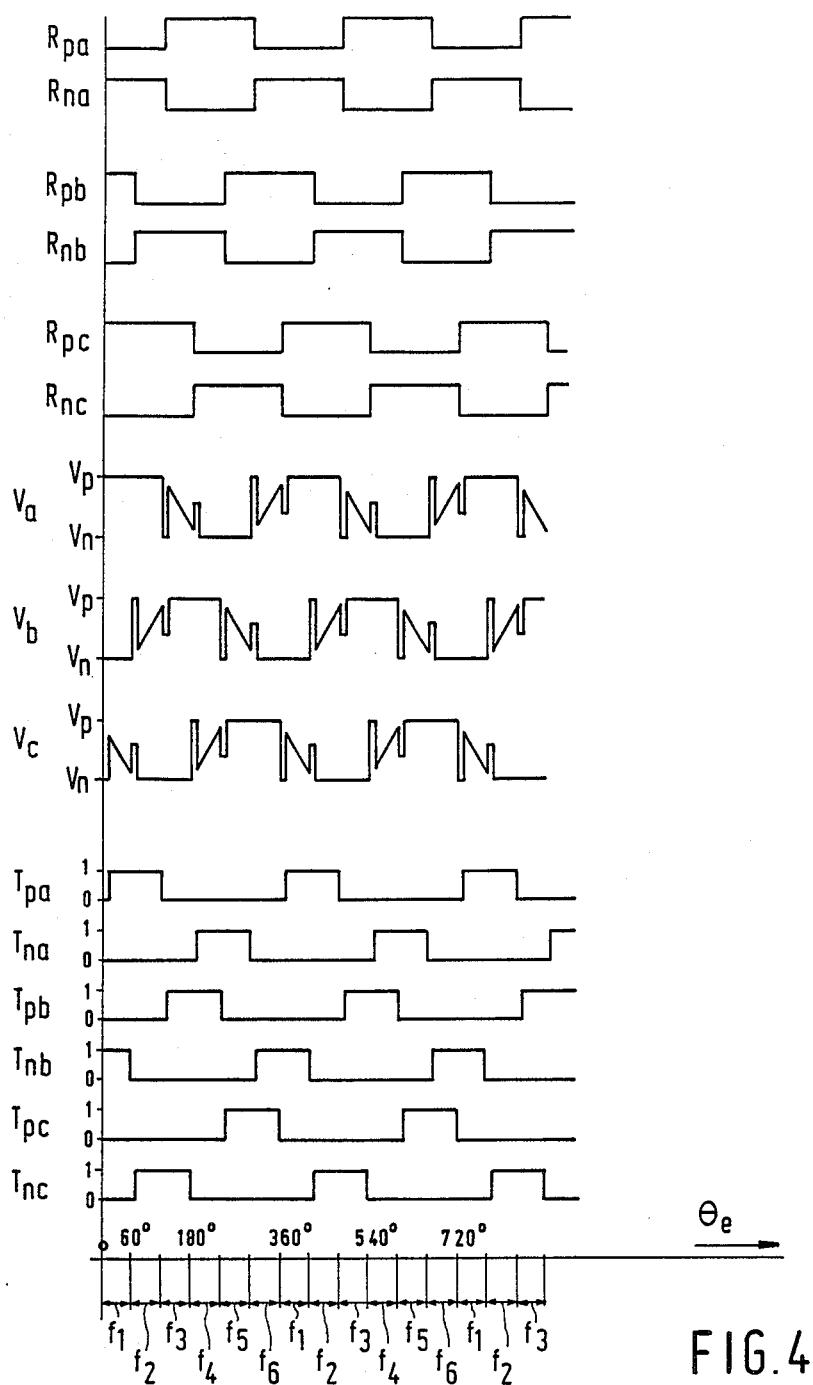

The distances between the switching devices 22 (22A, 22B, 22C) which are spaced along the rotor circumference are selected in such a way that when the rotor rotates the sections 42 of the control circuits 31 (31A, 31B, 31C), under the influence of the rotor magnet field, generate reset signals which are phase-shifted 120 electrical degrees relative to each other (see FIG. 4). This results in a detection of the opening instants of the switches 26 and 27 which depends entirely on the rotor position.

For the purpose of generating a set signal $S_n$ the section 43 comprises an edge-sensitive pulse generator 50 of a customary type, which produces a pulse $V_{sn}$ in response to a fast positive voltage change on its input. The input of the pulse generator 50 is connected to the junction point 30. The output pulse $V_{sn}$ together with the signal $R_p$ and the reset signal $R_p$, which has been delayed by a specific delay $\tau_1$ by a delay circuit 51, is applied to a three-input AND-gate 52. This delayed signal is referred to hereinafter as $R_p'$. The output signal of the AND-gate 52 is applied to an input of an OR-gate 53. The reset signal $R_p$ which has been delayed by a specific amount $\tau_1 + \tau_2$) by the delay circuits 51 and 54 is applied to an input of a monostable multivibrator 53A. The output signal of the monostable multivibrator 53A is applied to a second input of the OR-gate 53. Hereinafter, this output signal is referred to as $R_p''$. The output signal of the OR-gate 53 serves as the set signal $S_n$.

For generating the set signal $S_p$ the section 43 comprises a second edge-sensitive pulse generator 55 of a customary type, which generates a pulse $V_{sp}$ in response to a fast negative voltage change at its input. The input of the pulse generator 55 is connected to the junction point 30. The output signal of the pulse generator 55 is applied to an input of a three-input AND-gate 56. The reset signal $R_p$ which has been delayed by the delay circuit 51 and subsequently inverted by the inverter circuit 57 is applied to one of the other inputs of the AND-gate 56. This delayed and inverted signal is referred to hereinafter as $R_n'$. Further, the signal $R_n$ is applied to an input of the AND-gate 56. The output of the AND-gate 56 is connected to an input of an OR-gate 58. The reset signal $R_p''$, which has been inverted by an inverter circuit 59, is applied to another input of the OR-gate 58. Hereinafter, this inverted signal is referred to as $R_n''$. The output signal of the OR-gate 58 serves as the set signal $S_p$.

The commutation of the motor will now be explained with reference to FIGS. 4 and 5.

FIG. 4 shows the reset signals $R_p$ ($R_{pa}$, $R_{pb}$, $R_{pc}$) and $R_n$ ($R_{na}$, $R_{nb}$, $R_{nc}$), the control signals $T_p$ ($T_{pa}$, $T_{pb}$, $T_{pc}$) and $T_n$ ($T_{na}$, $T_{nb}$, $T_{nc}$) and the voltages on the junction points 30 (30A, 30B, 30C) for the switching devices 22 (22A, 22B, 22C) as a function of the angle $\theta_e$ between the rotor and stator at the nominal speed, $\theta_e$ being expressed in electrical degrees. The rotor positions are denoted by means of six succeeding ranges $f_1, \ldots, f_6$, together covering an angle $\theta_e$ equal to 360 electrical degrees.

Figures 3, 5:
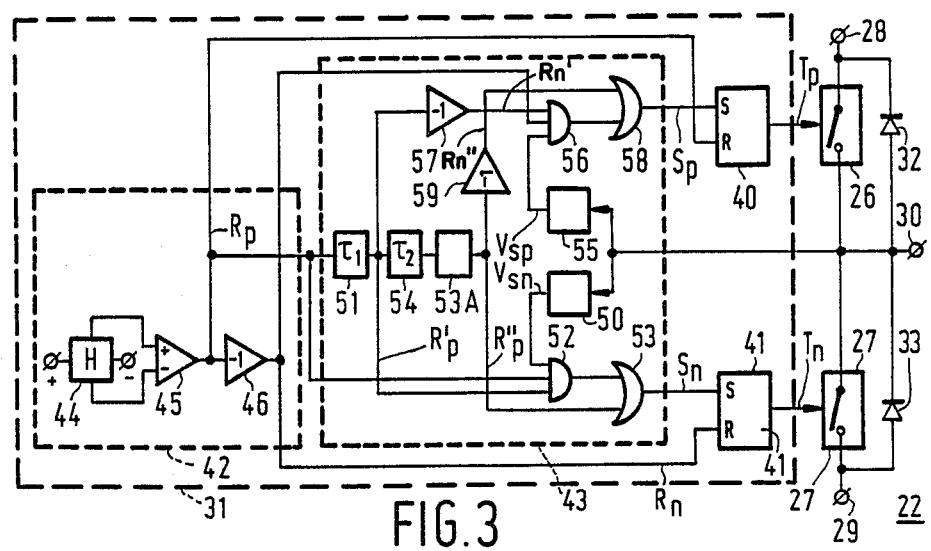
FIG. 3 shows a switching device in accordance with the invention.
FIGS. 4 and 5 show a number of signal waveforms occurring in the motor.

In FIG. 5 the voltage $V_c$, the reset signal $R_{pc}$, the reset signal $R_{pc}'$ which has been delayed by the time $\tau_1$ and appears on the output of the delay circuit 51, the signal $R_{pc}''$ on the output of the delay circuit 54, the set signal $S_{nc}$, the signal $V_{snc}$, and the control signal $T_{nc}$ for the switch 27C are plotted as a function of time t.

In the commutation range $f_1$, which commences at the instant $t_0$, the logic states of $T_{pa}$ and $T_{nb}$ are "1", which means that the switch 26A and the switch 27B are closed and the other switches 26 and 27 are open. The voltage $V_a$ on the junction point 30A is then equal to the voltage $V_p$ on the positive terminal 23 of the d.c. power source 25 and the voltage $V_b$ on the junction point 30B is then equal to the voltage $V_n$ on the negative terminal 24 of this source. The junction point 30C is then fully disconnected from the d.c. power source 25. The voltage difference between the junction points 30A and 30B produces currents $I_{AB}$, $I_{BC}$, $I_{AC}$ in the motor coils. As a result of the torque produced by the currents $I_{AB}$, $I_{BC}$ and $I_{AC}$ the rotor will be driven, causing the angle $\theta_e$ to increase. At the instant $t_1$ (see FIG. 5) at the end of the commutation range $f_1$ the logic state of $R_{nb}$ changes from 0 to 1, so that the control signal $T_{nb}$ supplied by the flip-flop 41 of the control circuit 31B changes from "1" to "0", causing the switch 27B to be opened. In response to the switch 27B being opened the voltage $V_b$ on the junction 30B will suddenly increase to such an extent owing to the inductance of the coils 16, ..., 21 that the freewheel diode 32B is turned on briefly, which means that the voltage $V_p$ briefly becomes substantially equal to the voltage $V_b$. As a result of the step change of the voltage $V_b$, the voltage on the junction point 30C will also increase step-wise. In response to the positive step change of the voltage $V_c$ the pulse generator 50 generates a pulse $V_{snc}$ (see FIG. 5). In the meantime the delayed reset signal $R_{pc}'$ has become "1", so that a set pulse $S_{nc}$ is produced at the output of the OR-gate 53 of the control circuit 31C, causing the control signal $T_{nc}$ on the output of the flip-flop 41 to become "1" and the switch 27C to be closed. The voltage $V_c$ then becomes equal to the voltage $V_n$.

As is shown in FIG. 5, a pulse $V_{snc}$ is not only generated at the instant $t_1$ but also at the instant $t_0$ at the beginning of the commutation range $f_1$ and at the instants $t_3$ and $t_4$ in the commutation range $f_2$. However, these pulses should not give rise to a set signal $S_{nc}$. A correct choice of the delay time $\tau_1$ then ensures that the signal $R_{pc}'$ is still "0" at the instant $t_0$, while the signal $R_{pc}'$ has become "1" at the instant $t_1$. In that case the pulse $V_{snc}$ at the instant $t_0$ is not transferred to the OR-gate 53 by the AND-gate 52, so that no set pulse $S_{nc}$ is generated, whereas at the instant $t_1$ the pulse $S_{nc}$ is transferred. Since the signal $R_p$ is also applied to the AND-gate 52 it is avoided that undesired set pulses $S_{nc}$ are generated at the instants $t_3$ and $t_4$ in the range $f_2$.

In the same way as at the end of the commutation range $f_1$, one of the switches 26 or 27 is opened at the end of each of the subsequent commutation ranges, each time in response to a "0"-"1" transition of one of the reset signals $R_p$ or $R_n$. In response to a voltage step on the junction point 30 to be coupled, the control circuit 31 coupled to this junction point 30 generates a set signal $S_p$ or $S_n$ depending on the sign of said voltage step, as a result of which this junction point is connected to the positive terminal 23 or the negative terminal 24 of the direct voltage source 25. Thus, commutation is effected in such a way that each switching device need only be connected to the positive terminal 23 and the negative terminal 24 of the d.c. power source 25 and to one of the power supply lines A, B or C of the motor, thus ensuring a satisfactory contiguity of the closing instants of the switches and the opening instants of the switches. The information which is needed to assure a proper contiguity of the closing instants and opening instants is transferred via the coils of the motor.

The small number of terminals (three) for each switching device is attractive, in particular if the complete switching device is to be incorporated in an integrated circuit, because the cost price of the casing of an integrated circuit is greatly influenced by the number of terminals needed.

In the motor described herein one of the switches 26 and 27 in each switching device is closed in response to a stepwise voltage change caused by a switch of another switching device being opened. This produces a pulse-shaped signal on the outputs of the AND-gates 52 or 56. However, if no pulse is produced on the output of the AND-gate 52 within the time interval $\tau_1+\tau_2$ after a "0"-"1" transition of $R_p$, which interval is determined by the delay circuits, the switch 26 is closed in response to "0"-"1" transition of the delayed signal $R_{pc}''$ on the output of the delay circuit 54. Similarly if no pulse is generated on the output of the AND-gate 56 within the time interval $\tau_1+\tau_2$ after a "1"-"0" transition of the signal $R_p$, the switch 27 is closed in response to an "0"-"1" transition of the delayed and inverted signal on the output of the inverter circuit 57.

These steps ensure that the commutation is sustained in the event that a voltage change on the junction point caused by a switch 26 or 27 being opened does not result in a set pulse being generated, for example as a result of an occasional fault condition.

In the embodiment described herein the sections 43 for generating the set signals $S_p$ and $S_n$ detect the voltage steps produced by opening of the switches 26 and 27 by means of edge-sensitive pulse generators 50 and 55. It is evident that these voltage steps can also be detected in various other ways, for example by level detection.

The scope of the invention is not limited to motors in which the stator coils are arranged in delta. These stator coils may also be arranged in star.

What is claimed is:

1. A brushless d.c. motor comprising: a permanent-magnetic rotor, a stator provided with stator coils coupled between at least three power supply lines, and a commutation circuit for cyclic connection and disconnection of the power supply lines to a d.c. power source by means of switching devices controlled by the rotor magnet field, each switching device comprising a series arrangement of a first electronic switch and a second electronic switch, the series arrangement being connectable between a positive terminal and a negative terminal of the d.c. power source, a plurality of magneto-sensitive elements for detecting the rotor magnet field, and each switching device includes a control circuit for opening its first and second electronic switches depending on the rotor magnetic field detected by an associated magneto-sensitive element, each of the power supply lines being connected to a respective junction point between the first and second electronic switches, characterized in that the control circuit of each switching device comprises means for closing the first electronic switch or the second electronic switch in response to a voltage change at the junction point between the first electronic switch and the second electronic switch produced by an induced voltage pulse in a stator coil and caused by opening one of said first and second electronic switches of another one of the switching devices.

2. A brushless d.c. motor as claimed in claim 1 wherein the control circuit of each switching device further comprises a second means for closing the first electronic switch and the second electronic switch of the control circuit in response to the magnetic field detected by the magneto-sensitive element, characterized in that the control circuit of each switching device comprises delay means for disabling the second closing means for a specific time.

3. A brushless d.c. motor as claimed in claim 1, wherein said means for closing the first electronic switch or the second electronic switch depends on the polarity of the voltage change.

4. A brushless DC-motor comprising: a permanent magnetic rotor, a stator provided with stator coils coupled to at least three power supply lines, and a separate switching device for each of the power supply lines with each switching device comprising a series arrangement of first and second electronic switches for connection between a positive and a negative pole of a DC-power source, a junction point between the first and second electronic switches of each switching device being connected to a corresponding power supply line, each switching device further comprising a control circuit controlling the first and second electronic switches so that each of the poles of the DC-power source is connected to the power supply lines in a cyclic switching pattern to cyclically energize the stator coils so that at each commutation moment one of the two poles is disconnected from one of the power supply lines and connected to another power supply line, the control circuit of each of the switching devices including a magneto-sensitive element for detecting the rotor magnet field and means for opening the first and second electronic switches in dependence on the magnetic field detected by the magneto-sensitive element, said control circuit further comprising means for closing the first electronic switch in response to detection of an induction voltage peak at said junction point of the switching device caused by opening of the first electronic switch of another one of the switching devices and means for closing the second electronic switch in response to detection of an induction voltage peak at said junction point of the switching device caused by opening of the second electronic switch of said another one of the switching devices.

5. A DC-motor as claimed in claim 4 wherein the control circuit of each switching device further comprises delay means for closing the first electronic switch a first predetermined time interval after the opening of the second electronic switch of the switching device in the event that the first electronic switch is still open at the end of said first predetermined time interval and delay means for closing the second electronic switch a second predetermined time interval after the opening of the first electronic switch of the switching device in the event that the second electronic switch is still open at the end of said second predetermined time interval.

6. A DC-motor as claimed in claim 4 wherein said means for closing the first electronic switch are adapted to close the first electronic switch in response to a step-shaped voltage change of a first polarity first occurring in third time intervals between the opening of the second electronic switch and a subsequent closing of the first electronic switch, each of said third time intervals beginning a minimum time after a preceding opening of the second electronic switch, and wherein said means for closing the second electronic switch are adapted to close the second electronic switch in response to a step-shaped voltage change of a second polarity, opposite to the first polarity, first occurring in fourth time intervals between the opening of the first electronic switch and subsequent closings of the second electronic switch, each of the fourth time intervals beginning at a minimum time after a preceding opening of the first electronic switch.

7. A brushless DC-motor comprising: a permanent magnetic rotor, a stator having stator coils coupled to at least three power supply lines, an electronic commutation circuit comprising switching means for selectively connecting the power supply lines to a pole of a DC-power source in response to first control signals and for selectively disconnecting the power supply lines from said pole in response to second control signals, said commutation circuit including control means for generating the first and second control signals so that the power supply lines are connected in turn to said pole of the DC power source in accordance with a predetermined cyclic sequence, said control means including magneto sensitive elements arranged so as to detect the rotor magnetic field for deriving the second control signals therefrom, and means for generating the first control signals in response to induction voltage peaks induced in the stator coils which occur when a power supply line is disconnected from a pole of the DC power source.

8. A DC-motor as claimed in claim 7 wherein said magneto-sensitive elements and said control means cooperate so as to be responsive to the polarity of signals generated by passage of the rotor magnetic field past the magneto-sensitive elements during operation of the motor.

* * * * *